US012480005B2

United States Patent
Nakashima et al.

(10) Patent No.: US 12,480,005 B2
(45) Date of Patent: Nov. 25, 2025

(54) METHOD FOR PREPARING CATIONIC ELECTRODEPOSITION COATING COMPOSITION

(71) Applicant: NIPPON PAINT AUTOMOTIVE COATINGS CO., LTD., Osaka (JP)

(72) Inventors: Sari Nakashima, Hirakata (JP); Nobuhiro Miyamae, Hirakata (JP); Taku Kanazawa, Hirakata (JP); Hirohisa Kano, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 994 days.

(21) Appl. No.: 17/614,435

(22) PCT Filed: May 25, 2020

(86) PCT No.: PCT/JP2020/020596
§ 371 (c)(1),
(2) Date: Nov. 26, 2021

(87) PCT Pub. No.: WO2020/241590
PCT Pub. Date: Dec. 3, 2020

(65) Prior Publication Data
US 2022/0282098 A1  Sep. 8, 2022

(30) Foreign Application Priority Data

May 29, 2019 (JP) .................. 2019-100016

(51) Int. Cl.
| | |
|---|---|
| *C09D 5/44* | (2006.01) |
| *C08G 18/22* | (2006.01) |
| *C08G 18/80* | (2006.01) |
| *C08K 3/22* | (2006.01) |
| *C08K 5/092* | (2006.01) |
| *C09D 7/20* | (2018.01) |
| *C09D 7/61* | (2018.01) |
| *C09D 7/63* | (2018.01) |
| *C09D 7/80* | (2018.01) |
| *C09D 175/04* | (2006.01) |

(52) U.S. Cl.
CPC ......... *C09D 5/4496* (2013.01); *C08G 18/227* (2013.01); *C08G 18/8025* (2013.01); *C08K 3/22* (2013.01); *C08K 5/092* (2013.01); *C09D 5/4457* (2013.01); *C09D 5/4465* (2013.01); *C09D 7/20* (2018.01); *C09D 7/61* (2018.01); *C09D 7/63* (2018.01); *C09D 7/80* (2018.01); *C09D 175/04* (2013.01); *C08K 2003/221* (2013.01)

(58) Field of Classification Search
CPC .............. C08G 18/286; C08G 18/2855; C08G 18/227; C08G 18/8074; C08G 18/8064; C08G 18/8025; C08G 18/8077; C08G 18/643; C08G 18/7671; C08G 18/2825; C08G 18/73; C09D 5/4457; C09D 17/007; C09D 7/63; C09D 7/45; C09D 7/61; C09D 7/80; C09D 175/04; C09D 5/4438; C09D 7/20; C09D 5/4496; C09D 175/12; C09D 5/4453; C09D 5/4465; C08K 5/092; C08K 3/22; C08K 5/09; C08K 2003/221
See application file for complete search history.

(56) References Cited

U.S. PATENT DOCUMENTS

| | | | |
|---|---|---|---|
| 5,936,013 A * | 8/1999 | Feola ................... | C09D 5/4492 523/414 |
| 2004/0106710 A1* | 6/2004 | Klein ................... | C09D 5/4492 524/394 |
| 2011/0184119 A1* | 7/2011 | Bloess ................. | B01J 21/063 977/773 |

FOREIGN PATENT DOCUMENTS

| | | |
|---|---|---|
| EP | 3 354 701 | 8/2018 |
| JP | 3293633 | 6/2002 |
| JP | 3874386 | 1/2007 |
| WO | 99/06493 | 2/1999 |
| WO | 99/31187 | 6/1999 |
| WO | 2017/051901 | 3/2017 |

OTHER PUBLICATIONS

Extended European Search Report issued May 22, 2023 in European Patent Application No. 20813239.9.
International Preliminary Report on Patentability and Written Opinion of the International Searching Authority issued Nov. 16, 2021 in International (PCT) Application No. PCT/JP2020/020596.

* cited by examiner

*Primary Examiner* — James Lin
*Assistant Examiner* — Kevin Sylvester
(74) *Attorney, Agent, or Firm* — Wenderoth, Lind & Ponack, L.L.P.

(57) ABSTRACT

An object of the present invention is to provide a preparation method for improving the edge part rust prevention property in the preparation of a cationic electrodeposition coating composition containing a bismuth compound as a curing catalyst. The present invention provides a method for preparing a cationic electrodeposition coating composition, including a step of preparing a resin emulsion (i) containing an aminated resin (A) and a blocked isocyanate curing agent (B), a step of preparing a pigment dispersion paste (ii) containing a bismuth-metal oxide mixture liquid (C) containing a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F), and a step of mixing the resin emulsion (i) and the pigment dispersion paste (ii).

9 Claims, No Drawings

METHOD FOR PREPARING CATIONIC ELECTRODEPOSITION COATING COMPOSITION

TECHNICAL FIELD

The present invention relates to a method for preparing a cationic electrodeposition coating composition.

BACKGROUND ART

Cationic electrodeposition coating compositions generally comprise a resin emulsion and a pigment dispersion paste. In such cationic electrodeposition coating compositions, organotin compounds have been widely used as a curing catalyst. However, organotin compounds may probably be restricted to use in the future from recent environmental control trends. Therefore, it is necessary to develop an alternative catalyst for an organotin compound.

Studies have been conducted on the use of a bismuth compound as a curing catalyst for a cationic electrodeposition coating composition. However, for example, merely dispersing a bismuth compound such as bismuth oxide or bismuth hydroxide in a pigment dispersion paste reduces the catalytic activity of the bismuth compound, and the coating film cannot be sufficiently cured. In addition, there is a problem that when the bismuth compound is added to the cationic electrodeposition coating composition, the storage stability of the coating composition or the pigment dispersion paste is deteriorated and aggregation occurs during storage.

A method is disclosed in which a bismuth compound is mixed and dissolved in advance with an amine-containing carboxylic acid such as an amino acid and then the resulting mixture is used for the preparation of a pigment dispersion paste (Patent Literature 1). Further, there is also disclosed a method in which a bismuth compound is mixed and dissolved with lactic acid in advance and then the resulting mixture is added to a coating material (Patent Literature 2). As described in these documents, there is an advantage that the catalytic activity is improved by dissolving bismuth in advance. On the other hand, in order to dissolve bismuth in advance, it is necessary to use a large amount of acid. When a large amount of acid is used for dissolving bismuth, there are problems that the conductivity of the electrodeposition coating composition increases, the electrodeposition coating workability deteriorates and the appearance of a resulting coating film deteriorates.

Incidentally, in general, cationic electrodeposition coating compositions are often applied mainly for the purpose of imparting rust prevention properties to articles to be coated. From the viewpoint of imparting a rust prevention property, improving the rust prevention property of an edge part of an article to be coated is one of technical challenges strongly desired in the coating field. In an electrodeposition coating composition which is to be subjected to a heating and curing step after electrodeposition coating, leveling of a coating film occurs due to heat flow during heating and curing. When the coated article has an edge part, the leveling tends to reduce the film thickness of the edge part to deteriorate the rust prevention property of the edge part.

One example of a method for improving the rust prevention property of an edge part is a method including suppressing the flow of an electrodeposition coating film due to heat flow during heating and curing of an electrodeposition coating film, thereby securing a film thickness at the edge part, and thereby improving the rust prevention property. In this method, in order to suppress the flow of a coating film due to heat flow during heating and curing, there is employed a technique of increasing the viscosity of an electrodeposition coating composition by, for example, adding a thickener to the electrodeposition coating composition. However, the addition of a thickener to an electrodeposition coating composition will impair the leveling property of a coating film, so that the surface condition of a part other than the edge part, such as a flat part, may be impaired.

CITATIONS LIST

Patent Literature

Patent Literature 1: Japanese Patent No. 3293633
Patent Literature 2: Japanese Patent No. 3874386

SUMMARY OF THE INVENTION

Technical Problems

In the field of cationic electrodeposition coating, there are various technical problems such as development of an alternative catalyst for organotin compounds, improvement of edge part rust prevention property without deterioration of coating film smoothness, and the like as described above. The present invention solves the above-described problems of conventional techniques, and an object of the present invention is to provide a method of improving an edge part rust prevention property in the preparation of a cationic electrodeposition coating composition comprising a bismuth compound as a curing catalyst.

Solutions to Problems

In order to solve the above-described problems, the present invention provides the following embodiments.

[1] A method for preparing a cationic electrodeposition coating composition, comprising the following steps:

a step of preparing a resin emulsion (i) comprising an aminated resin (A) and a blocked isocyanate curing agent (B);

a step of preparing a pigment dispersion paste (ii) comprising a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F); and a step of mixing the resin emulsion (i) and the pigment dispersion paste (ii) to prepare a cationic electrodeposition coating composition, wherein the pigment dispersion paste (ii) is prepared by the following steps:

a bismuth-metal oxide mixture liquid (C) preparation step of mixing the bismuth compound (c1), the metal oxide (c2), the monohydroxycarboxylic acid (c3) having 3 to 5 carbon atoms in total and the solvent to prepare the bismuth-metal oxide mixture liquid (C); and a pigment dispersion paste (ii) preparation step of mixing the obtained bismuth-metal oxide mixture liquid (C) and the polyvalent acid (E), and then mixing the obtained mixture, the pigment dispersion resin (D) and the pigment (F) to prepare the pigment dispersion paste (ii), the metal oxide (c2) contains one or more metal elements selected from the group consisting of La, Nd, Y, Pr, Yb and Ce, the monohydroxycarboxylic acid (c3) having 3 to 5 carbon atoms in total has an asymmetric carbon atom, the monohydroxycarboxylic acid (c3) containing 80% or more of an L-form among its optical isomers, and in the bismuth-metal oxide mixture liquid (C) preparation step, the viscosity of the bismuth-metal oxide mixture liquid (C) is within a range of 2.5 mPas to 15 mPas.

[2] The preparation method described above, wherein in the bismuth-metal oxide mixture liquid (C) preparation step, the bismuth-metal oxide mixture liquid (C) is prepared by performing mixing of the bismuth compound (c1) with the monohydroxycarboxylic acid (c3) and mixing of the metal oxide (c2) with the monohydroxycarboxylic acid (c3), and then mixing the mixtures obtained by the respective mixings with a solvent, the mixing of the bismuth compound (c1) with the monohydroxycarboxylic acid (c3) is performed at a pH within a range of 2.0 to 4.1, and the ratio of the number of moles of the metal element of the bismuth compound (c1) contained in the bismuth-metal oxide mixture liquid (C) to the number of moles of the monohydroxycarboxylic acid (c3) is within a range of (c1):(c3)=1:0.5 to 1:4.0.

[3] The preparation method described above, wherein in the mixing of the metal oxide (c2) with the monohydroxycarboxylic acid (c3), the ratio of the number of moles of the metal element of the metal oxide (c2) contained in the bismuth-metal oxide mixture liquid (C) to the number of moles of the monohydroxycarboxylic acid (c3) is within a range of (c2):(c3)=1:0.5 to 1:3.25.

[4] The preparation method described above, wherein the molar ratio of the metal element of the bismuth compound (c1) to that of the metal oxide (c2) contained in the bismuth-metal oxide mixture liquid (C) is within a range of (c1):(c2)=0.1:1 to 10:1.

[5] The preparation method described above, wherein the polyvalent acid (E) is one or more compound selected from the group consisting of compounds having two or more carboxylic acid groups and compounds having a phosphoric acid group.

[6] A pigment dispersion paste to be used for the preparation of a cationic electrodeposition coating composition, wherein the pigment dispersion paste comprises a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F); the metal oxide (c2) contains one or more metal elements selected from the group consisting of La, Nd, Y, Pr, Yb and Ce, the monohydroxycarboxylic acid (c3) having 3 to 5 carbon atoms in total has an asymmetric carbon atom, the monohydroxycarboxylic acid (c3) containing 80% or more of an L-form among its optical isomers, the polyvalent acid (E) is one or more compounds selected from the group consisting of compounds having two or more carboxylic acid groups and compounds having a phosphoric acid group, and the ratio of the total number of moles of the metal elements of the bismuth compound (c1) and the metal oxide (c2) contained in the bismuth-metal oxide mixture liquid (C) to the number of moles of the monohydroxycarboxylic acid (c3) is within a range of ((c1)+(c2)):(c3)=0.55:1 to 4:1.

[7] A cationic electrodeposition coating composition comprising the pigment dispersion paste.

[8] A method for preparing a pigment dispersion paste, wherein the pigment dispersion paste comprises a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F); the method for preparing the pigment dispersion paste comprises the following steps:

a bismuth-metal oxide mixture liquid (C) preparation step of mixing the bismuth compound (c1), the metal oxide (c2), the monohydroxycarboxylic acid (c3) having 3 to 5 carbon atoms in total and the solvent to prepare the bismuth-metal oxide mixture liquid (C); and a pigment dispersion paste (ii) preparation step of mixing the obtained bismuth-metal oxide mixture liquid (C) and the polyvalent acid (E), and then mixing the obtained mixture, the pigment dispersion resin (D) and the pigment (F) to prepare the pigment dispersion paste (ii), the metal oxide (c2) contains one or more metal elements selected from the group consisting of La, Nd, Y, Pr, Yb and Ce, the monohydroxycarboxylic acid (c3) having 3 to 5 carbon atoms in total has an asymmetric carbon atom, the monohydroxycarboxylic acid (c3) containing 80% or more of an L-form among its optical isomers, and in the bismuth-metal oxide mixture liquid (C) preparation step, the viscosity of the bismuth-metal oxide mixture liquid (C) is within a range of 2.5 mPas to 15 mPas.

[9] The preparation method described above, wherein in the bismuth-metal oxide mixture liquid (C) preparation step, the bismuth-metal oxide mixture liquid (C) is prepared by performing mixing of the bismuth compound (c1) with the monohydroxycarboxylic acid (c3) and mixing of the metal oxide (c2) with the monohydroxycarboxylic acid (c3), and then mixing the mixtures obtained by the respective mixings with a solvent, the mixing of the bismuth compound (c1) with the monohydroxycarboxylic acid (c3) is performed at a pH within a range of 2.0 to 4.1, and the ratio of the number of moles of the metal element of the bismuth compound (c1) contained in the bismuth-metal oxide mixture liquid (C) to the number of moles of (c3) is within a range of (c1):(c3)=1:0.5 to 1:4.0. [10] The preparation method described above, wherein in the mixing of the metal oxide (c2) with the monohydroxycarboxylic acid (c3), the ratio of the number of moles of the metal element of the metal oxide (c2) contained in the bismuth-metal oxide mixture liquid (C) to the number of moles of the monohydroxycarboxylic acid (c3) is within a range of (c2):(c3)=1:0.5 to 1:3.25.

Advantageous Effects of Invention

By electrodeposition coating the cationic electrodeposition coating composition obtained using the preparation method described above, a cationic electrodeposition coating composition superior in storage stability and coatability and capable of affording a coating film good in edge part rust prevention property and coating film appearance can be prepared.

DESCRIPTION OF EMBODIMENTS

Background of the Invention

First, the process leading to the present invention will be described. The present inventors have studied a cationic electrodeposition coating composition comprising a bismuth compound and a metal oxide for the purpose of solving two technical problems, namely, a problem of developing an alternative catalyst for an organotin compound and a problem of improving an edge part rust prevention property without deteriorating coating film smoothness. However, when these components are simply added, the storage stability of the electrodeposition coating composition may be poor. The storage stability of an electrodeposition coating composition can be a more important and difficult-to-overcome technical problem particularly when the electrodeposition coating composition is used in a high-temperature and high-humidity area. On the other hand, since a high-temperature and high-humidity condition is an environment in which corrosion such as rust is likely to occur, it is required that a rust prevention property such as an edge part rust prevention property is also good.

The present inventors have aimed to solve both of the above technical problems. Then, the present inventors have found through experiments that both of the technical problems can be solved by preparing a pigment dispersion paste in a specific procedure in the preparation of an electrodeposition coating composition comprising a bismuth compound and a metal oxide, and have accomplished the present invention. Hereinafter, the preparation method will be described in detail.

The method for preparing a cationic electrodeposition coating composition comprises a step of preparing a pigment dispersion paste (ii) comprising a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F). The preparation method is characterized in that a cationic electrodeposition coating composition containing a bismuth compound as a curing catalyst affords good edge part rust prevention performance, good coating film appearance and good coatability as a result of preparing, in a specific step, a bismuth-metal oxide mixture liquid (C) comprising a bismuth compound (c1) and a metal oxide (c2).

Resin Emulsion (i)

The electrodeposition coating composition obtained by the preparation method described above contains a resin emulsion (i) comprising an aminated resin (A) and a blocked isocyanate curing agent (B). The resin emulsion (i) may optionally further comprise other components.

Aminated Resin (A)

The aminated resin (A) is a coating film-forming resin for constituting an electrodeposition coating film. As the aminated resin (A), a cationically modified epoxy resin obtained by modifying an oxirane ring in a resin skeleton with an organic amine compound is preferable. Generally, a cationically modified epoxy resin is prepared by ring-opening an oxirane ring in a starting raw material resin molecule via a reaction with a primary amine, secondary amine or tertiary amine and/or an amine of an acid salt thereof. Typical examples of the starting raw material resin include polyphenol polyglycidyl ether type epoxy resins, which are reaction products of polycyclic phenol compounds, such as bisphenol A, bisphenol F, bisphenol S, phenol novolac, and cresol novolac, with epichlorohydrin. Examples of other starting raw material resins include the oxazoline ring-containing epoxy resins disclosed in JP-A-5-306327. Such epoxy resins can be prepared via a reaction of a diisocyanate compound or a bisurethane compound obtained by blocking the isocyanate groups of a diisocyanate compound with a lower alcohol such as methanol and ethanol, with epichlorohydrin.

The starting raw material resin can be chain-extended with a bifunctional polyester polyol, a polyether polyol, a bisphenol, a dibasic carboxylic acid, or the like before a ring-opening reaction of an oxirane ring with an amine, and then used. Especially, a bisphenol with which chain extension is performed can be used during the ring-opening reaction of an oxirane ring with an amine.

Likewise, before a ring-opening reaction of an oxirane ring with an amine, to control a molecular weight or an amine equivalent or improve heat flowability, the starting raw material resin can be provided with addition of a monohydroxy compound such as 2-ethylhexanol, nonylphenol, ethylene glycol mono-2-ethylhexyl ether, ethylene glycol mono-n-butyl ether, propylene glycol mono-2-ethylhexyl ether, or a monocarboxylic acid compound such as octylic acid to some oxirane rings and then used.

Examples of an amine that can be used when ring-opening an oxirane ring and thereby introducing an amino group include a primary amine, secondary amine, or tertiary amine and/or an acid salt thereof, such as butylamine, octylamine, diethylamine, dibutylamine, methylbutylamine, monoethanolamine, diethanolamine, N-methylethanolamine, triethylamine, N,N-dimethylbenzylamine, and N,N-dimethylethanolamine. Moreover, a ketimine-blocked primary amino group-containing secondary amine such as aminoethylethanolamine methyl isobutyl ketimine, and diethylene triamine diketimine can also be used. To open all oxirane rings, such amines need to be reacted by at least equivalent for the oxirane rings.

The number-average molecular weight of the aminated resin (A) is preferably 1,000 to 5,000. The condition that the number-average molecular weight is 1,000 or more affords good physical properties of a resulting cured electrodeposition coating film such as solvent resistance and corrosion resistance. On the other hand, the condition that the number-average molecular weight is 5,000 or less makes it easy to adjust the viscosity of the aminated resin and possible to perform smooth synthesis, and makes it easy to handle emulsification and dispersion of the resulting aminated resin (A). The number-average molecular weight of the aminated resin (A) is preferably within the range of 1,600 to 3,200.

In the present description, the number-average molecular weight is a number-average molecular weight in terms of polystyrene as measured by gel permeation chromatography (GPC).

The aminated resin (A) preferably has an amine value within the range of 20 to 100 mg KOH/g. The condition that the amine value of the aminated resin (A) is 20 mg KOH/g or more leads to good emulsification-dispersion stability of the aminated resin (A) in an electrodeposition coating composition. On the other hand, the condition that the amine value is 100 mg KOH/g or less leads to a proper amount of amino groups in a cured electrodeposition coating film and has no possibility to lower the water resistance of a coating film. The amine value of the aminated resin (A) is more preferably within the range of 20 to 80 mg KOH/g.

The hydroxyl value of the aminated resin (A) is preferably within the range of 50 to 400 mg KOH/g. The condition that the hydroxyl value is 50 mg KOH/g or more leads to good curing of a cured electrodeposition coating film. On the other hand, the condition that the hydroxyl value is 400 mg KOH/g or less leads to a proper amount of hydroxyl groups remaining in a cured electrodeposition coating film and has no possibility to lower the water resistance of a coating film.

The hydroxyl value of the aminated resin (A) is more preferably within the range of 100 to 300 mg KOH/g.

In the electrodeposition coating composition of the present invention, use of an aminated resin (A) having a number-average molecular weight of 1,000 to 5,000, an amine value of 20 to 100 mg KOH/g, and a hydroxyl value of 50 to 400 mg KOH/g affords an advantage that superior corrosion resistance can thereby be imparted to an object to be coated.

As the aminated resin (A), aminated resins differing in amine value and/or hydroxyl value may optionally be used in combination. When two or more aminated resins differing in amine value and hydroxyl value are used in combination, the average amine value and the average hydroxyl value calculated on the basis of the mass ratio of the aminated resins to be used are preferably within the above-mentioned numerical values. As the aminated resins (A) to be used in combination, an aminated resin having an amine value of 20 to 50 mg KOH/g and a hydroxyl value of 50 to 300 mg KOH/g and an aminated resin having an amine value of 50 to 200 mg KOH/g and a hydroxyl value of 200 to 500 mg KOH/g are preferably used in combination. Use of such a combination affords an advantage that superior corrosion resistance can thereby be imparted because the core part of an emulsion is thereby made more hydrophobic and the shell part of the emulsion is made more hydrophilic.

The aminated resin (A) may optionally contain an amino group-containing acrylic resin, an amino group-containing polyester resin, or the like.

Blocked Isocyanate Curing Agent (B)

The blocked isocyanate curing agent (B) (hereinafter sometimes simply referred to as "curing agent (B)") is also a coating film-forming resin that constitutes an electrodeposition coating film. The blocked isocyanate curing agent (B) can be prepared by blocking a polyisocyanate with a blocking agent.

Examples of the polyisocyanate include aliphatic diisocyanates such as hexamethylene diisocyanate (including a trimer), tetramethylene diisocyanate and trimethylhexamethylene diisocyanate; cycloaliphatic polyisocianates such as isophorone diisocyanate and 4,4'-methylene-bis-(cyclohexyl isocyanate); and aromatic diisocyanates such as 4,4'-diphenylmethane diisocyanate, tolylene diisocyanate and xylylene diisocyanate (urethanized materials, materials modified with carbodiimide, uretdione, uretonimine, biuret and/or isocyanurate).

Examples of the blocking agent that may preferably be used include monohydric alkyl (or aromatic) alcohols such as n-butanol, n-hexyl alcohol, 2-ethylhexanol, lauryl alcohol, phenol carbinol and methylphenyl carbinol; cellosolves such as ethylene glycol monohexyl ether and ethylene glycol mono-2-ethylhexyl ether; polyether-type both-ended diols such as polyethylene glycol, polypropylene glycol and polytetramethylene ether glycol phenol; polyester-type both-ended polyols obtained from a diol such as ethylene glycol, propylene glycol or 1,4-butanediol and a dicarboxylic acid such as oxalic acid, succinic acid, adipic acid, suberic acid or sebacic acid; phenols such as para-t-butylphenol and cresol; oximes such as dimethyl ketoxime, methyl ethyl ketoxime, methyl isobutyl ketoxime, methyl amyl ketoxime and cyclohexanone oxime; and lactams typified by ε-caprolactam and γ-butyrolactam.

The blocking ratio of the blocked isocyanate curing agent (B) is preferably 100%. This affords an advantage that the storage stability of the electrodeposition coating composition is improved.

As the blocked isocyanate curing agent (B), a curing agent prepared by blocking an aliphatic diisocyanate with a blocking agent and a curing agent prepared by blocking an aromatic diisocyanate with a blocking agent are preferably be used in combination.

The blocked isocyanate curing agent (B) preferentially reacts with the primary amine of the aminated resin (A), and further reacts with a hydroxyl group to be cured.

As the curing agent, at least one curing agent selected from the group consisting of organic curing agents such as melamine resin or phenol resin, silane coupling agents, and metal curing agents may be used in combination with the blocked isocyanate curing agent (B).

Preparation of Resin Emulsion (i)

The resin emulsion (i) can be prepared by dissolving each of the aminated resin (A) and the blocked isocyanate curing agent (B) in an organic solvent to prepare a solution, mixing these solutions, and then performing neutralization with a neutralizing acid. Examples of the neutralizing acid include organic acids such as methanesulfonic acid, sulfamic acid, lactic acid, dimethylol propionic acid, formic acid, and acetic acid. In the present invention, it is more preferable to neutralize the resin emulsion containing the aminated resin (A) and the curing agent (B) with one or more acids selected from the group consisting of formic acid, acetic acid, and lactic acid.

The content of the curing agent (B) is required be an amount sufficient for reacting with a primary amino group, a secondary amino group, or an active hydrogen-containing functional group such as a hydroxyl group in the aminated resin (A) during curing to afford a good cured coating film. A preferred content of the curing agent (B) is within the range of 90/10 to 50/50, more preferably 80/20 to 65/35, in terms of the solid mass ratio of the aminated resin (A) to the curing agent (B) (aminated resin (A)/curing agent (B)). By adjusting the solid mass ratio of the aminated resin (A) and the curing agent (B), the fluidity and the curing rate of the coating film (deposited film) at the time of film formation are improved, and the coating film appearance is improved.

The resin solid content of the resin emulsion (i) is usually preferably 25 to 50% by mass, and particularly preferably 35 to 45% by mass based on the total amount of the resin emulsion (i). Here, the term "the solid content of a resin emulsion" means the mass of all components that are contained in the resin emulsion and remain in a solid form even after the removal of a solvent. Specifically, it means the total of the mass of the aminated resin (A), the curing agent (B), and other resin components optionally added, which are contained in the resin emulsion (i).

The neutralizing acid is more preferably used in an amount of 10 to 100%, even more preferably 20 to 70%, in the equivalent ratio of the neutralizing acid to the equivalent of the amino groups of the aminated resin (A). In this description, the equivalent ratio of the neutralizing acid to the equivalent of the amino groups of the aminated resin (A) is taken as the neutralization ratio. When the neutralization ratio is 10% or more, the affinity to water is secured and the dispersibility in water is improved.

Pigment Dispersion Paste (ii)

The preparation method includes a step of preparing a pigment dispersion paste. The pigment dispersion paste (ii) comprises a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F); and is prepared by the following steps:

a bismuth-metal oxide mixture liquid (C) preparation step of mixing the bismuth compound (c1), the metal oxide (c2), the monohydroxycarboxylic acid (c3) having 3 to 5 carbon atoms in total and the solvent to prepare the bismuth-metal oxide mixture liquid (C); and a pigment dispersion paste (ii) preparation step of mixing the obtained bismuth-metal oxide mixture liquid (C) with the polyvalent acid (E), and then mixing the obtained mixture, the pigment dispersion resin (D) and the pigment (F) to prepare the pigment dispersion paste (ii):

Bismuth-Metal Oxide Mixture Liquid (C)

The bismuth-metal oxide mixture liquid (C) is prepared by mixing a bismuth compound (c1), a metal oxide (c2), a monohydroxycarboxylic acid (c3) having 3 to 5 carbon atoms in total and a solvent (bismuth-metal oxide mixture liquid (C) preparation step). In the following, respective components are described in detail.

Bismuth Compound (c1)

The bismuth compound (c1) is a compound containing bismuth metal and may be, for example, bismuth oxide, bismuth hydroxide, bismuth nitrate, or a mixture thereof. A preferred bismuth compound (c1) is at least one species selected from the group consisting of bismuth oxide and bismuth hydroxide.

As the bismuth compound (c1), one in a powder form is used. The average particle size of the bismuth compound (c1) is preferably 0.5 to 20 μm, and more preferably 1 to 3 μm. In the present description, the average particle size refers to a volume-average particle diameter D50, which is a value measured with a dispersion diluted with ion-exchanged water such that an appropriate signal level is attained using a laser Doppler type particle size analyzer ("Microtrac UPA150" manufactured by Nikkiso Co., Ltd.).

The amount of the bismuth compound (c1) contained in the electrodeposition coating composition of the present invention is preferably 0.05 to 1.0% by mass in terms of the metal element based on the amount of the resin solid of the resin emulsion (i) contained in the electrodeposition coating composition. Due to the condition that the amount of the bismuth compound (c1) is within the above range, the resin component of the resin emulsion (i) can be cured well and the storage stability of the electrodeposition coating composition can be kept good.

In the present description, "in terms of metal element" means determining the amount of a target metal element by multiplying the content of a metal compound by a metal element conversion factor (a factor for converting the amount of the metal compound to the amount of the metal element, specifically, a value calculated by dividing the atomic weight of the metal element in the metal compound by the molecular weight of the metal compound). For example, when the bismuth compound (c1) is bismuth oxide ($Bi_2O_3$, molecular weight: 466), the content of bismuth in terms of the metal element in the electrodeposition coating composition containing 0.5% by mass of bismuth oxide based on the resin solid content of the resin emulsion (i) is calculated to be 0.448% by mass by the calculation of 0.5% by mass x (418±466).

The bismuth compound (c1) can impart good curing performance to a cationic electrodeposition coating composition. When the cationic electrodeposition coating composition contains the bismuth compound (c1), it is not necessary to use a lead compound, an organotin compound, or the like as a curing catalyst. Thus, an electrodeposition coating composition substantially containing neither a tin compound nor a lead compound can be prepared.

Metal Oxide (c2)

The metal oxide (c2) to be used in the preparation of the pigment dispersion paste (ii) is a rare earth compound comprising one or more metal elements selected from the group consisting of La, Nd, Y, Pr, Yb and Ce. The metal element contained in the metal oxide (c2) is preferably one or more members selected from the group consisting of La, Nd, Y and Yb, and more preferably is La. Since the electrodeposition coating composition in the present invention contains the metal oxide (c2), superior edge part rust prevention performance will be obtained. In addition, the use of the oxide of a metal element as the metal component affords an advantage that it is possible to form a coating film in which color difference does not occur easily and which has a good coating film appearance.

The metal oxide (c2) is preferably in a powder form, and the average particle size thereof is preferably 0.5 to 20 μm and more preferably 1 to 3 μm. The average particle size means a value measured in the same manner as described above.

The content of the metal oxide (c2) is preferably an amount equivalent to 0.01 to 2% by mass, more preferably an amount equivalent to 0.05 to 1.5% by mass, and even more preferably an amount equivalent to 0.20 to 1% by mass, in terms of metal element based on the resin solid content of the resin emulsion (i) contained in the electrodeposition coating composition. The condition that the content ratio of the metal oxide (c2) to the resin solid content of the resin emulsion (i) is within the above range affords an advantage that good edge part rust prevention performance can be obtained and good storage stability of the resin emulsion and the electrodeposition coating composition can be secured.

The term "in terms of a metal element" refers to a content of a metal compound multiplied by a metal element conversion factor (a factor for converting the amount of the metal compound to the amount of the metal element as described above. For example, when the metal of the metal oxide (c2) is lanthanum oxide ($La_2O_3$, molecular weight: 325.8), the content of lanthanum in terms of metal element in an electrodeposition coating composition containing 0.1% by mass of lanthanum oxide is calculated to be 0.0853% by mass by the calculation: 0.1% by mass x (277.8÷325.8).

Monohydroxycarboxylic Acid (c3) Having 3 to 5 Carbon Atoms in Total

In the preparation method, a bismuth-metal oxide mixture liquid (C) is prepared using a monohydroxycarboxylic acid (c3) having 3 to 5 carbon atoms in total in addition to the bismuth compound (c1) and the metal oxide (c2). As the monohydroxycarboxylic acid (c3) having 3 to 5 carbon atoms in total, a monohydroxycarboxylic acid (c3) having an asymmetric carbon atom and containing 80% or more of an L-form among its optical isomers is required to be used.

In the present description, "%" in "containing 80% or more of an L-form" is a value by mass ratio, and means "% by mass".

The monohydroxycarboxylic acid (c3) having 3 to 5 carbon atoms in total is preferably an aliphatic monohydroxymonocarboxylic acid having 3 to 5 carbon atoms in total. Examples of the monohydroxycarboxylic acid (c3) having 3 to 5 carbon atoms in total include lactic acid (3 carbon atoms in total), 2-hydroxybutyric acid (4 carbon atoms in total), and 3-hydroxybutyric acid (4 carbon atoms in total).

It is more preferable to use one or more compounds selected from the group consisting of lactic acid and 2-hydroxybutyric acid as the monohydroxycarboxylic acid (c3) having 3 to 5 carbon atoms in total.

The use form of the monohydroxycarboxylic acid (c3) having 3 to 5 carbon atoms in total is not particularly limited, and examples thereof include a solid form, a liquid form, a solution form dissolved in a solvent, especially an aqueous solution form. Examples of a solvent that can be used for the preparation of an aqueous solution of the monohydroxycarboxylic acid (c3) having 3 to 5 carbon atoms in total include water such as ion-exchanged water, purified water and distilled water, and an aqueous solvent containing water as a main component. The aqueous solvent may contain an optional organic solvent (e.g., a water-soluble or water-miscible organic solvent such as alcohols, esters, and ketones) in addition to water.

In the above preparation, by using a monohydroxycarboxylic acid having an asymmetric carbon atom as the monohydroxycarboxylic acid (c3) having 3 to 5 carbon atoms in total and using a monohydroxycarboxylic acid (c3) containing 80% or more of an L-form among its optical isomers, it is possible to satisfactorily secure fine dispersion of the bismuth compound (c1) and the metal oxide (c2) and satisfactorily secure good storage stability of a resulting electrodeposition coating composition. Although not being bound by a theory, that is probably because when a monohydroxycarboxylic acid (c3) containing 80% or more of an L-form among its optical isomers is used, it acts on each of the bismuth compound (c1) and the metal oxide (c2) well in a state where it contributes to their dispersion stability, affording a fine dispersion state and good dispersion stability of each of the bismuth compound (c1) and the metal oxide (c2). In addition, securing the fine dispersion state of each of the bismuth compound (c1) and the metal oxide (c2) affords an advantage that it is possible to form a coating film in which a color difference does not occur easily and which has a good coating film appearance.

Examples of the solvent that is used for the preparation of the bismuth-metal oxide mixture liquid (C) include water such as ion-exchanged water, purified water and distilled water, and an aqueous solvent containing water as a main component. The aqueous solvent may contain an optional organic solvent (e.g., a water-soluble or water-miscible organic solvent such as alcohols, esters, and ketones) in addition to water.

Preparation of Bismuth-Metal Oxide Mixture Liquid (C)

The bismuth-metal oxide mixture liquid (C) is prepared by mixing a bismuth compound (c1), a metal oxide (c2), a monohydroxycarboxylic acid (c3) having 3 to 5 carbon atoms in total and a solvent (bismuth-metal oxide mixture liquid (C) preparation step). In the mixing, the components can be added and mixed in any order.

In the bismuth-metal oxide mixture liquid (C) preparation step, it is more preferable prepare the bismuth-metal oxide mixture liquid (C) by performing mixing of the bismuth compound (c1) with the monohydroxycarboxylic acid (c3) and mixing of the metal oxide (c2) with the monohydroxycarboxylic acid (c3), followed by mixing the mixtures obtained by the respective mixings with a solvent. As described above, performing the mixing of the bismuth compound (c1) with the monohydroxycarboxylic acid (c3) and the mixing of the metal oxide (c2) with the monohydroxycarboxylic acid (c3) affords an advantage that an optimum amount of the monohydroxycarboxylic acid (c3) can be mixed to the dispersion state of each of the bismuth compound (c1) and the metal oxide (c2).

The mixing conditions such as temperature and stirring rate in the mixing described above may be conditions usually performed in the production of coating compositions, and the mixing can be performed, for example, at 10 to 50° C., preferably 20 to 40° C., at a stirring rate at which a stirring flow capable of dispersing the respective components is generated. The stirring time can be arbitrarily selected depending on the scale of a reaction system, a stirrer and so on. The stirring time may be, for example, 5 minutes to 2 hours.

The mixing of the bismuth compound (c1) with the monohydroxycarboxylic acid (c3) is preferably performed at a pH within the range of 2.0 to 4.1. When the mixing is performed at a pH within the range of 2.0 to 4.1, there is an advantage that the bismuth compound (c1) can be stably dispersed in a finer state.

The pH in the mixing can be adjusted, for example, by the amount of the monohydroxycarboxylic acid (c3) to be mixed.

By mixing the bismuth compound (c1) and the monohydroxycarboxylic acid (c3) having 3 to 5 carbon atoms in total, the solubility and dispersion stability of the bismuth compound (c1) are improved, so that an electrodeposition coating composition superior in coating material stability and curability can be obtained. Details of this mechanism are not necessarily clear, and are not bound by a theory, but it is considered that by mixing the bismuth compound (c1) and the monohydroxycarboxylic acid (c3) having 3 to 5 carbon atoms in total, a part of the bismuth compound is dissolved with the monohydroxycarboxylic acid (c3) having 3 to 5 carbon atoms in total, and a part of the bismuth compound is dispersed (for example, chelate-like dispersed) together with the monohydroxycarboxylic acid (c3) having 3 to 5 carbon atoms in total, so that the bismuth compound (c1) is finely dispersed.

The ratio of the number of moles of the metal element of the bismuth compound (c1) to the number of moles of the monohydroxycarboxylic acid (c3) is more preferably within the range of (c1):(c3)=1:0.5 to 1:4.0. The ratio is more preferably within the range of (c1):(c3)=1:0.5 to 1:2. When the ratio (c1):(c3) is within the above range, there is an advantage that the bismuth compound (c1) can be stably dispersed in a finer state.

In addition, in the mixing of the metal oxide (c2) with the monohydroxycarboxylic acid (c3), the ratio of the number of moles of the metal element of the metal oxide (c2) to the number of moles of the monohydroxycarboxylic acid (c3) is more preferably within the range of (c2):(c3)=1:0.5 to 1:3.25. The ratio is more preferably within the range of (c2):(c3)=1:2 to 1:3.25. When the molar ratio of the content of the monohydroxycarboxylic acid (c3) is within the above range, there is an advantage that the solubility of the metal oxide (c2), the storage stability of the electrodeposition coating composition and the pigment dispersion paste, the edge part rust prevention performance, etc. can be satisfactorily secured.

In the bismuth-metal oxide mixture liquid (C) preparation step, the viscosity of the bismuth-metal oxide mixture liquid (C) is within the range of 2.5 mPas to 15 mPas. When the viscosity of the bismuth-metal oxide mixture liquid (C) is within the above range, there is an advantage that a fine dispersion state of the bismuth compound (c1) can be maintained good. Examples of the method for maintaining the viscosity of the bismuth-metal oxide mixture liquid (C) within the above range include a method of maintaining the pH within a range of 2.0 to 4.1 in the mixing of the bismuth compound (c1) with the monohydroxycarboxylic acid (c3). More specific examples thereof include a method of maintaining the pH within the range of 2.0 to 4.1 by adjusting the amount of the monohydroxycarboxylic acid (c3) in the mixing. Another example is a method of maintaining the viscosity of the bismuth-metal oxide mixture liquid (C) within the above range by using a polyoxyalkylene surfactant (e.g., SN-001S and SN-005S manufactured by San Nopco Ltd.), which is a viscosity modifier, in the mixing.

The molar ratio of the metal element of the bismuth compound (c1) to that of the metal oxide (c2) contained in the bismuth-metal oxide mixture liquid (C) is preferably within the range of (c1):(c2)=0.1:1 to 10:1, and more preferably within the range of (c1):(c2)=0.3:1 to 3:1. When the molar ratio of metal elements (c1):(c2) is within the above range, there is an advantage that both the coating film curability and the edge part rust prevention property can be highly achieved while good storage stability of the pigment dispersion paste (ii) is maintained.

The ratio of the total number of moles of the metal elements of the bismuth compound (c1) and the metal oxide (c2) to the number of moles of the monohydroxycarboxylic acid (c3) contained in the bismuth-metal oxide mixture liquid (C) is preferably within the range of ((c1)+(c2)):(c3) =0.55:1 to 4:1, and more preferably within the range of ((c1)+(c2)):(c3)=0.6:1 to 3:1.

Preparation of Pigment Dispersion Paste (ii)

In the preparation of a pigment dispersion paste (ii), the obtained bismuth-metal oxide mixture liquid (C) is mixed with the polyvalent acid (E), and then the obtained mixture is mixed with the pigment dispersion resin (D) and the pigment (F) (pigment dispersion paste (ii) preparation step)

Pigment Dispersion Resin (D)

The pigment dispersion resin (D) is a resin for dispersing a pigment, and it is dispersed in an aqueous medium and then used. As the pigment dispersion resin, there can be used a pigment dispersion resin having a cationic group, such as a modified epoxy resin having at least one member selected from the group consisting of a quaternary ammonium group, a tertiary sulfonium group, and a primary amine group. As the aqueous solvent, ion-exchanged water or water containing a small amount of alcohol is used.

As a pigment dispersion resin having a quaternary ammonium group, which is one example of the pigment dispersion resin (D), an amine-modified epoxy resin having a quaternary ammonium group is preferably used. The amine-modified epoxy resin having a quaternary ammonium group preferably has a hydroxyl value of 20 to 120 mg KOH/g. Such an amine-modified epoxy resin can be prepared, for example, by reacting a half-blocked isocyanate with a hydroxyl group of an epoxy resin having a hydroxyl group to introduce a blocked isocyanate group.

Generally, a polyepoxide is used as the epoxy resin. This epoxide has two or more 1,2-epoxy groups on average in one molecule. Useful examples of such polyepoxides include the epoxy resins described above.

The half-blocked isocyanate to be used to react with the epoxy resin is prepared by partially blocking a polyisocyanate. Preferably, the reaction between the polyisocyanate and the blocking agent is carried out by cooling the reactants to 40 to 50° C. while adding the blocking agent dropwise under stirring in the presence of a curing catalyst (e.g., a tin-based catalyst) as necessary.

The polyisocyanate is not particularly limited as long as it has two or more isocyanate groups on average in one molecule. As a specific example, a polyisocyanate that can be used in the preparation of the blocked isocyanate curing agent can be used.

Examples of suitable blocking agents for preparing the half-blocked isocyanate include lower aliphatic alkyl monoalcohols having 4 to 20 carbon atoms. Specific examples thereof include butyl alcohol, amyl alcohol, hexyl alcohol, 2-ethylhexyl alcohol and heptyl alcohol.

The reaction of the epoxy resin with the half-blocked isocyanate is preferably carried out by keeping the reactants at 140° C. for about 1 hour.

As the tertiary amine, one having 1 to 6 carbon atoms can be preferably used. Specific examples of the tertiary amine include dimethylethanolamine, trimethylamine, triethylamine, dimethylbenzylamine, diethylbenzylamine, N,N-dimethylcyclohexylamine, tri-n-butylamine, diphenethylmethylamine, dimethylaniline and N-methylmorpholine.

Furthermore, the neutralizing acid to be used in mixture with the tertiary amine is not particularly limited, and specific examples thereof include inorganic acids and organic acids such as hydrochloric acid, nitric acid, phosphoric acid, formic acid, acetic acid and lactic acid. The neutralizing acid is more preferably one or more acids selected from the group consisting of formic acid, acetic acid and lactic acid. The reaction of the thus-obtained neutralizing acid salt of a tertiary amine with the epoxy resin can be carried out by a conventional method. For example, the epoxy resin is dissolved in a solvent such as ethylene glycol monobutyl ether, the resulting solution is heated to 60 to 100° C., a neutralizing acid salt of a tertiary amine is added dropwise thereto, and the reaction mixture is held at 60 to 100° C. until the acid value reaches 1.

The amine-modified epoxy resin having a quaternary ammonium group preferably has an epoxy equivalent of 1000 to 1800. The epoxy equivalent is more preferably 1200 to 1700. The amine-modified epoxy resin having a hydroxyl value of 20 to 120 mg KOH/g preferably has a number-average molecular weight of 1500 to 2700.

As the pigment dispersion resin having a tertiary sulfonium group, which is another example of the pigment dispersion resin (D), a tertiary sulfonium group-modified epoxy resin is preferably used. The tertiary sulfonium group-modified epoxy resin can be prepared, for example, by reacting a half-blocked isocyanate with a hydroxyl group of an epoxy resin having a hydroxyl group to introduce a blocked isocyanate group, and reacting a sulfide compound with the blocked isocyanate group. Examples of the sulfide compound include 1-(2-hydroxyethylthio)-2-propanol, 1-(2-hydroxyethylthio)-2,3-propanediol, 1-(2-hydroxyethylthio)-2-butanol and 1-(2-hydroxyethylthio)-3-butoxy-1-propanol. The reaction of the sulfide compound can be carried out in the same manner as the reaction of the tertiary amine.

The amount of the pigment dispersion resin (D) in terms of the ratio (solid mass ratio) of the pigment (F) to the pigment dispersion resin (D) contained in the pigment dispersion paste is preferably within the range of pigment (F)/pigment dispersion resin (D)=1/0.1 to 1/1.5, and more preferably within the range of pigment (F)/pigment dispersion resin (D)=1/0.1 to 1/1.1. When the amount of the pigment dispersion resin (D) exceeds the above range, curing performance may be deteriorated. When the amount of the pigment dispersion resin (D) is less than the above range, defective pigment dispersion may occur.

Polyvalent Acid (E)

In the present description, the "polyvalent acid" refers to a compound having two or more monovalent acid groups or a compound having a divalent or higher valent acid group. The polyvalent acid (E) is preferably one or more compounds selected from the group consisting of a compound having two or more carboxylic acid groups and a compound having a phosphoric acid group. Specific examples of the polyvalent acid (E) include:

compounds having 2 to 6 carbon atoms and having two or more carboxylic acid groups, such as tartaric acid, glutamic acid, citric acid, malic acid, hydroxymalonic acid, malonic acid, succinic acid, glutaric acid and adipic acid;

polymers having two or more carboxylic acid groups, such as polyacrylic acid; and compounds having a phosphoric acid group, such as phosphoric acid and condensed phosphoric acid (e.g. diphosphoric acid, triphosphoric acid, polyphosphoric acid and cyclophosphoric acid etc.).

In the present description, the condensed phosphoric acid means an inorganic compound having two or more phosphoric acid groups. The condensed phosphoric acid can be prepared, for example, by a dehydration reaction of orthophosphoric acid ($H_3PO_4$) or a reaction similar thereto.

The polyvalent acid (E) is preferably one or more acids selected from the group consisting of tartaric acid, citric acid, phosphoric acid, condensed phosphoric acid, malic acid and polyacrylic acid, more preferably one or more acids selected from the group consisting of tartaric acid, citric acid and malic acid.

The amount of the polyvalent acid (E) to be used in the preparation of the pigment dispersion paste (ii) is preferably 0.01 to 10 parts by mass, more preferably 0.08 to 5 parts by mass, and still more preferably 0.09 to 3.5 parts by mass, based on 100 parts by mass of the resin solid content of the pigment dispersion resin (D). When the amount of the polyvalent acid (E) is less than 0.01 parts by mass, the effect as the polyvalent acid (E) may not be obtained. When the amount of the polyvalent acid (E) exceeds 10 parts by mass, curability may be deteriorated.

In the preparation of the pigment dispersion paste (ii), the bismuth-metal oxide mixture liquid (C) obtained as described above is mixed with the polyvalent acid (E), and then the pigment dispersion resin (D) and the pigment (F) are mixed, whereby the dispersion stability of the resulting pigment dispersion paste (ii) is improved, and an electrodeposition coating composition superior in coating material stability and curability is obtained. Details of this mechanism are not necessarily clear and are not bound by a theory, but are considered as follows.

It is considered that in the bismuth-metal oxide mixture liquid (C), a part of the bismuth compound is dissolved with the monohydroxycarboxylic acid (c3) having 3 to 5 carbon atoms in total, and a part of the bismuth compound is dispersed (for example, chelate-like dispersed) together with the monohydroxycarboxylic acid (c3) having 3 to 5 carbon atoms in total, and the bismuth compound (c1) is in a finely dispersed state. However, it is considered that the covering state of the bismuth compound at this stage is not sufficient, and when the pigment (F) is added, the pigment (F) and the bismuth compound (c1) may react with each other, leading to collapse of the covering state. Here, it is considered that by adding the polyvalent acid (E) to the bismuth-metal oxide mixture liquid (C) obtained as described above, a coating with the monohydroxycarboxylic acid (c3) having 3 to 5 carbon atoms in total is strengthened, good dispersion stability can be obtained, and a coating film in which a color difference does not occur easily and which has a good coating film appearance can be formed.

Pigment (F)

As the pigment (F), a pigment usually used in electrodeposition coating compositions can be used. Examples of the pigment include inorganic pigments and organic pigments which are usually used, for example, coloring pigments such as titanium white (titanium dioxide), carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, aluminum phosphomolybdate, and aluminum zinc phosphomolybdate.

The pigment (F) is preferably used in an amount of 1 to 30% by mass based on the resin solid content of the cationic electrodeposition coating composition.

The pigment dispersion paste (ii) is prepared by mixing the bismuth-metal oxide mixture liquid (C) and the polyvalent acid (E) obtained as described above, and then mixing the obtained mixture, the pigment dispersion resin (D) and the pigment (F) (pigment dispersion paste (ii) preparation step).

The method for mixing the pigment dispersion resin (D) and the pigment (F) may be any method. For example, the pigment dispersion resin (D) and the pigment (F) may be mixed in advance and then mixed with the mixture obtained as described above. By this mixing, a pigment dispersion paste is prepared. The conditions such as temperature and stirring rate in the mixing may be conditions usually performed in the production of coating compositions, and the mixing can be performed, for example, at 10 to 50° C., preferably 20 to 40° C., at a stirring rate at which a stirring flow capable of dispersing the pigment is generated. As for the stirring time, stirring is preferably until the pigment has a dispersion particle size of 10 μm or less, for example. Here, the dispersion particle size of the pigment can be determined by measuring the volume-average particle diameter of the pigment.

Production of Electrodeposition Coating Composition

The electrodeposition coating composition in the present invention can be prepared by mixing the resin emulsion (i) and the pigment dispersion paste (ii). The mixing ratio of the resin emulsion (i) to the pigment dispersion paste (ii) in terms of solid content mass ratio is preferably within the range of resin emulsion (i):pigment dispersion paste (ii)=1:0.1 to 1:0.4, and more preferably within the range of 1:0.15 to 1:0.3.

The solid content of the electrodeposition coating composition in the present invention is preferably 1 to 30% by mass based on the total amount of the electrodeposition coating composition. When the solid content of the electrodeposition coating composition is less than 1% by mass, a reduced amount of an electrodeposition coating film will be deposited, so that it may be difficult to ensure sufficient corrosion resistance. When the solid content of the electrodeposition coating composition exceeds 30% by mass, throwing power or appearance may deteriorate.

The electrodeposition coating composition in the present invention preferably has a pH of 4.5 to 7. When the pH of the electrodeposition coating composition is less than 4.5, this gives rise to the problem concerning poor corrosion resistance and generation of sludges in electrodeposition coating. The pH of the electrodeposition coating composition can be set within the above range by adjusting the amount of a neutralizing acid to be used, the amount of a free acid to be added, etc.

The pH of the electrodeposition coating composition can be measured using a commercially available pH meter having a temperature compensation function.

The milligram equivalent (MEQ (A)) of an acid per 100 g of the solid content of an electrodeposition coating composition is preferably 40 to 120. The milligram equivalent (MEQ (A)) of an acid per 100 g of the resin solid content of an electrodeposition coating composition can be adjusted by the amount of a neutralizing acid and the amount of a free acid.

MEQ (A) as referred to herein is an abbreviation of mg equivalent (acid), which is the sum total of mg equivalents of all acids per 100 g of the solid content of a coating. MEQ (A) can be measured by precisely weighing about 10 g of a solid of an electrodeposition coating composition, dissolving it in about 50 ml of a solvent (THF: tetrahydrofuran), then performing potentiometric titration using a 1/10 N NaOH solution and thereby determining the amount of an acid contained in the electrodeposition coating composition.

The electrodeposition coating composition in the present invention may optionally contain additives commonly used in the field of coatings, e.g., organic solvents such as ethylene glycol monobutyl ether, ethylene glycol monohexyl ether, ethylene glycol monoethylhexyl ether, propylene glycol monobutyl ether, dipropylene glycol monobutyl ether and propylene glycol monophenyl ether, drying inhibitors, surfactants such as antifoaming agents, viscosity modifiers such as acrylic resin fine particles, cissing inhibitors, inorganic anticorrosive agents such as vanadium salts, copper, iron, manganese, magnesium, and calcium salts. In addition to these, known auxiliary complexing agents, buffers, smoothing agents, stress relaxation agents, brighteners, semi-brighteners, antioxidants, ultraviolet absorbers, etc. may be blended according to the intended purpose. These additives may be mixed at the time of preparing the resin emulsion (i), may be mixed at the time of preparing the pigment dispersion paste (ii), or may be mixed at the time of mixing or after mixing the resin emulsion (i) and the pigment dispersion paste (ii).

The electrodeposition coating composition in the present invention may contain other coating film-forming resin components in addition to the aminated resin (A). Examples of such other coating film-forming resin components include acrylic resins, polyester resins, urethane resins, butadiene resins, phenol resins, and xylene resins. Other coating film-forming resin components may be an aminated resin which does not correspond to the above-described aminated resin (A). As such other coating film-forming resin components that may be contained in the electrodeposition coating composition, phenol resins and xylene resins are preferable.

Examples of the phenol resins and the xylene resins include xylene resins having 2 or more and 10 or less aromatic rings.

Electrodeposition Coating and Formation of Electrodeposition Coating Film

An article to be coated can be subjected to electrodeposition coating and formation of an electrodeposition coating film using the electrodeposition coating composition in the present invention.

In electrodeposition coating using the electrodeposition coating composition in the present invention, an article to be coated is used as a cathode, and a voltage is applied between the cathode and an anode. As a result, an electrodeposition coating film is deposited on the object to be coated.

In an electrodeposition coating step, electrodeposition coating is performed by immersing an article to be coated in an electrodeposition coating composition, and then applying a voltage of 50 to 450 V. If the applied voltage is less than 50 V, electrodeposition may be insufficiently performed, and if the applied voltage is more than 450 V, the coating film may be broken to have poor appearance. During electrodeposition coating, the bath liquid temperature of the coating composition is usually adjusted to 10 to 45° C.

The time for which the voltage is applied varies depending on electrodeposition conditions, and it may be generally 2 to 5 minutes.

The film thickness of the electrodeposition coating film is adjusted preferably to a thickness that leads to an electrodeposition coating film finally obtained by heating and curing having a thickness of 5 to 40 µm, more preferably 10 to 25 µm. When an electrodeposition coating film has a film thickness of less than 5 µm, the corrosion resistance may be insufficient. On the other hand, when the film thickness exceeds 40 µm, the coating material will be wasted.

After completion of the electrodeposition process, the electrodeposition coating film obtained as described above is heated at 120 to 260° C., preferably 140 to 220° C., for 10 to 30 minutes as it is or after being rinsed, whereby a heated and cured electrodeposition coating film is formed.

As an article to be coated with the electrodeposition coating composition in the present invention, various articles capable of being fed with electricity can be used. Examples of the usable article to be coated include cold-rolled steel sheets, hot-rolled steel sheets, stainless steels, electrogalvanized steel sheets, hot-dip galvanized steel sheets, zinc-aluminum alloy-based plated steel sheets, zinc-iron alloy-based plated steel sheets, zinc-magnesium alloy-based plated steel sheets, zinc-aluminum-magnesium alloy-based plated steel sheets, aluminum-based plated steel sheets, aluminum-silicon alloy-based steel sheets and tin-based plated steel sheets.

EXAMPLES

The present invention will be described hereafter in more detail by way of examples, to which the present invention is not intended to be limited. In the examples, "parts" and "%" are on a mass basis unless otherwise indicated.

Production Example 1: Production of Pigment Dispersion Resin (D)

Preparation of 2-Ethylhexanol Half-Blocked Isophorone Diisocyanate 222.0 parts of isophorone diisocyanate (hereinafter, abbreviated as IPDI) was added in a reaction vessel equipped with a stirrer, a condenser tube, a nitrogen inlet tube and a thermometer, and was diluted with 39.1 parts of methyl isobutyl ketone (MIBK), and 0.2 parts of dibutyltin dilaurate was added thereto. Thereafter, the mixture was heated to 50° C., and 131.5 parts of 2-ethylhexanol was then added dropwise under stirring in a dry nitrogen atmosphere over 2 hours, affording 2-ethylhexanol half-blocked IPDI (solid content: 90.0% by mass).

Preparation of Modified Epoxy Resin and Pigment Dispersion Resin (D)

A reaction vessel equipped with a stirrer, a nitrogen inlet tube and a cooling tube was charged with 351.6 parts of EPON 828 (epoxy resin manufactured by Shell Kagaku Co., Ltd., epoxy equivalent: 190) and 99.2 parts of bisphenol A, and heated to 130° C. under a nitrogen atmosphere, 1.41 parts of benzyldimethylamine was added, and the mixture was reacted at 170° C. for about 1 hour to afford a bisphenol-type epoxy resin having an epoxy equivalent of 450. Subsequently, after cooling to 140° C., 218.3 parts of the previously prepared 2-ethylhexanol half-blocked IPDI (solid content: 196.5 parts) was added and reacted.

This mixture was maintained at 140° C. for 1 hour, and then 172.3 parts of dipropylene glycol monobutyl ether was added thereto for dilution. Then, the reaction mixture was cooled to 100° C., and 408.0 parts of SHP-100 (1-(2-hydroxyethylthio)-2-propanol, manufactured by Sanyo Chemical Industries, Ltd.) (solid content: 136.0 parts), 134.0 parts of dimethylol propionic acid, and 144.0 parts of deionized water were added thereto. This mixture was reacted at 70 to 75° C. until the acid value reached 3.0 or less to afford a resin having a tertiary sulfonation ratio of 70.6%. This mixture was diluted with 324.8 parts of dipropylene glycol monobutyl ether to afford a pigment dispersion resin (D) (resin solid content: 50%).

Production Example 2: Production of Aminated Resin (A-1)

First, 92 parts of methyl isobutyl ketone, 940 parts of a bisphenol A-type epoxy resin (trade name: DER-331J, produced by The Dow Chemical Company), 382 parts of bisphenol A, 63 parts of octylic acid and 2 parts of dimethylbenzylamine were added, and then were reacted until the epoxy equivalent was 1110 g/eq while the temperature in the reaction vessel was held at 140° C., and then cooling was performed until the temperature in the reaction vessel was 120° C. A mixture of 78 parts of diethylenetriamine diketimine (methyl isobutyl ketone solution having a solid content of 73%) and 92 parts of diethanolamine was then added, and reacted at 120° C. for 1 hour, affording an aminated resin (A-1) (cationically modified epoxy resin). The resin had a number-average molecular weight of 2,560, an amine value (milligram equivalent of a base based on 100 g of the resin solid content: MEQ (B)) of 50 mg KOH/g (where the amine value derived from the primary amine was 14 mg KOH/g), and a hydroxyl value of 240 mg KOH/g.

Production Example 3-1: Production of Blocked Isocyanate Curing Agent (B-1)

1680 parts of hexamethylene diisocyanate (HDI) and 732 parts of MIBK were added in a reaction vessel, and heated to 60° C. A solution of 346 parts of trimethylolpropane in 1067 parts of MEK oxime was added thereto dropwise at 60° C. over 2 hours. Further, the mixture was heated at 75° C. for 4 hours, disappearance of an absorption based on an isocyanate group was then confirmed in IR spectrum measurement. The mixture was allowed to cool, and 27 parts of MIBK was then added, affording a blocked isocyanate curing agent (B-1) having a solid content of 78%. The isocyanate group value was 252 mg KOH/g.

Production Example 3-2: Production of Blocked Isocyanate Curing Agent (B-2)

A reaction vessel was charged with 1340 parts of 4,4'-diphenylmethane diisocyanate and 277 parts of MIBK, which were then heated to 80° C., and a solution of 226 parts of ε-caprolactam in 944 parts of butyl cellosolve was then added dropwise at 80° C. over 2 hours. Further, the mixture was heated at 100° C. for 4 hours, disappearance of an absorption based on an isocyanate group was then confirmed in IR spectrum measurement, the mixture was allowed to cool, and 349 parts of MIBK was then added, affording a blocked isocyanate curing agent (B-2) (solid content: 80%). The isocyanate group value was 251 mg KOH/g.

Production Example 4: Production of Amine-Modified Epoxy Resin Emulsion (1)

350 parts (solid content) of the aminated resin (A-1) obtained in Production Example 2 was mixed with 75 parts (solid content) of the blocked isocyanate curing agent (B-1) obtained in Production Example 3-1 and 75 parts (solid content) of the blocked isocyanate curing agent (B-2) obtained in Production Example 3-2, and ethylene glycol mono-2-ethylhexyl ether was added in an amount of 3% (15 parts) based on the solid content. Next, the mixture was neutralized by adding formic acid in such a manner that the addition amount corresponded to a resin neutralization ratio of 40%, the mixture was slowly diluted by adding ion-exchanged water, and methyl isobutyl ketone was then removed under a reduced pressure so that the solid content was 40%, thereby affording an amine-modified epoxy resin emulsion (1).

Example 1

Production of Pigment Dispersion Paste

To 99 parts of ion-exchanged water were added 4.3 parts of a 50% aqueous solution of lactic acid (L-form), 5.5 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.9.

13.4 parts of a 50% aqueous solution of lactic acid (L-form) and 5.8 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, and 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Production of Cationic Electrodeposition Coating Composition

In a stainless steel vessel, 492.8 parts of ion-exchanged water, 375.1 parts of the emulsion (1) of the amine-modified epoxy resin prepared in Production Example 4 (which was used as a resin emulsion (i)), and 87.2 parts of the above pigment dispersion paste were added, and the mixture was then aged at 40° C. for 16 hours to afford a cationic electrodeposition coating composition.

The viscosity of the bismuth-metal oxide mixture liquid (C) was measured using a digital Stormer viscometer (manufactured by Ueshima Seisakusho Co., Ltd.). The viscosity can be measured by adjusting the temperature of the sample to 25° C. and measuring the number of seconds required for 100 rotations.

Example 2

To 99 parts of ion-exchanged water were added 4.3 parts of a 50% aqueous solution of lactic acid (L-form), 5.6 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.9.

13.6 parts of a 50% aqueous solution of lactic acid (L-form) and 5.9 parts of neodymium oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, then 90.5 parts of the pigment dispersion resin (D) obtained in Production Example 1 was added and mixed, and further 0.9 parts of carbon black as a pigment, 41.7 parts of titanium oxide and 45.5 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 3

A pigment dispersion paste was obtained by the same procedure as in Example 1 except that 5.8 parts of cerium oxide was used instead of 5.8 parts of lanthanum oxide.

Using the obtained pigment dispersion paste, an electrodeposition coating composition was obtained by the same procedure as in Example 1.

Example 4

A pigment dispersion paste was obtained by the same procedure as in Example 2 except that 5.8 parts of yttrium oxide was used instead of 5.9 parts of neodymium oxide.

Using the obtained pigment dispersion paste, an electrodeposition coating composition was obtained by the same procedure as in Example 1.

Example 5

A pigment dispersion paste was obtained by the same procedure as in Example 1 except that 5.8 parts of praseodymium oxide was used instead of 5.8 parts of lanthanum oxide.

Using the obtained pigment dispersion paste, an electrodeposition coating composition was obtained by the same procedure as in Example 1.

Example 6

A pigment dispersion paste was obtained by the same procedure as in Example 1 except that 5.8 parts of ytterbium oxide was used instead of 5.8 parts of lanthanum oxide.

Using the obtained pigment dispersion paste, an electrodeposition coating composition was obtained by the same procedure as in Example 1.

Example 7

To 99 parts of ion-exchanged water were added 5 parts of a 50% aqueous solution of 2-hydroxybutyric acid (L-form), 5.6 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.9.

13.6 parts of a 50% aqueous solution of lactic acid (L-form) and 5.9 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, then 90.5 parts of the pigment dispersion resin (D) obtained in Production Example 1 was added and mixed, and further 0.9 parts of carbon black as a pigment, 41.7 parts of titanium oxide and 45.5 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 8

A pigment dispersion paste was obtained by the same procedure as in Example 1 except that 5.5 parts of bismuth hydroxide was used instead of 5.6 parts of bismuth oxide.

Using the obtained pigment dispersion paste, an electrodeposition coating composition was obtained by the same procedure as in Example 1.

Example 9

A pigment dispersion paste was obtained by the same procedure as in Example 1 except that 1.9 parts of a 10% aqueous citric acid solution was used instead of 1.9 parts of a 10% aqueous tartaric acid solution.

Using the obtained pigment dispersion paste, an electrodeposition coating composition was obtained by the same procedure as in Example 1.

Example 10

To 99 parts of ion-exchanged water were added 2.8 parts of a 50% aqueous solution of lactic acid (L-form), 3.6 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 4.0.

8.8 parts of a 50% aqueous solution of lactic acid (L-form) and 3.8 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, and 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 11

To 99 parts of ion-exchanged water were added 1.9 parts of a 50% aqueous solution of lactic acid (L-form), 5.5 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.9.

16 parts of a 50% aqueous solution of lactic acid (L-form) and 5.8 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, then 90.5 parts of the pigment dispersion resin (D) obtained in Production Example 1 was added and mixed, and further 0.9 parts of carbon black as a pigment, 41.7 parts of titanium oxide and 45.5 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 12

To 98 parts of ion-exchanged water were added 0.5 parts of a 50% aqueous solution of lactic acid (L-form), 0.7 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 4.0.

1.5 parts of a 50% aqueous solution of lactic acid (L-form) and 9.2 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, then 90.5 parts of the pigment dispersion resin (D) obtained in Production Example 1 was added and mixed, and further 0.9 parts of carbon black as a pigment, 41.7 parts of titanium oxide and 45.5 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 13

To 99 parts of ion-exchanged water were added 4.3 parts of a 50% aqueous solution of lactic acid (L-form), 5.5 parts of bismuth oxide and 0.11 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.5.

13.4 parts of a 50% aqueous solution of lactic acid (L-form) and 5.8 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 2.5 mPa·s.

Then, 1.9 parts of a 10% aqueous tartaric acid solution was added, and 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 14

To 99 parts of ion-exchanged water were added 17.7 parts of a 50% aqueous solution of lactic acid (L-form), 5.5 parts of bismuth oxide, 5.8 parts of lanthanum oxide and 0.2 parts of viscosity modifier SN-001S (manufactured by San Nopco Ltd.) such that the solid concentration of the dispersed paste became 47% by mass, and the mixture was stirred at 1000 rpm at room temperature for 1 hour to afford a bismuth-metal oxide mixture liquid (C). The pH at the time of stirring was 2.9. The viscosity of the obtained bismuth-metal oxide mixture liquid (C) was 3.0 mPa·s.

Then, 1.9 parts of a 10% aqueous tartaric acid solution was added, and 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Example 15

To 99 parts of ion-exchanged water were added 3.4 parts of a 50% aqueous solution of lactic acid (L-form), 0.9 parts of a 50% aqueous solution of lactic acid (DL-form), 5.5 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.9.

10.7 parts of a 50% aqueous solution of lactic acid (L-form), 2.7 parts of a 50% aqueous solution of lactic acid (DL-form) and 5.8 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 1.9 parts of a 10% aqueous tartaric acid solution was added, and 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Comparative Example 1

A pigment dispersion paste was obtained by the same procedure as in Example 1 except that a 50% aqueous solution of lactic acid (DL-form) was used instead of the 50% aqueous solution of lactic acid (L-form).

Using the obtained pigment dispersion paste, an electrodeposition coating composition was obtained by the same procedure as in Example 1.

Comparative Example 2

To 98 parts of ion-exchanged water were added 4.1 parts of a 50% aqueous solution of lactic acid (L-form), 5.3 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 5.0. The obtained mixture liquid had a viscosity of 2.0 mPas.

Then, 1.9 parts of a 10% aqueous tartaric acid solution was added, and 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Comparative Example 3

To 101 parts of ion-exchanged water were added 4.3 parts of a 50% aqueous solution of lactic acid (L-form), 5.5 parts of bismuth oxide and 0.2 parts of viscosity modifier SN-001S (manufactured by San Nopco Ltd.) such that the solid concentration of the dispersed paste became 47% by mass, and the mixture was stirred at room temperature for 1 hour. The pH at the time of stirring was 2.9.

13.4 parts of a 50% aqueous solution of lactic acid (L-form) and 5.8 parts of lanthanum oxide were further added thereto, and the mixture was stirred at 1000 rpm at room temperature for 1 hour to afford a bismuth-metal oxide mixture liquid (C). The viscosity of the obtained bismuth-metal oxide mixture liquid (C) was 3.0 mPa·s.

Then, 90.5 parts of the pigment dispersion resin (D) obtained in Production Example 1 was added and mixed, and further 0.9 parts of carbon black as a pigment, 41.7 parts of titanium oxide and 45.6 parts of Satintone (calcined kaolin) were added, and the mixture was stirred with a sand mill at 2000 rpm at 40° C. for 1 hour to afford a pigment dispersion paste.

Using the obtained pigment dispersion paste, an electrodeposition coating composition was obtained by the same procedure as in Example 1.

Comparative Example 4

To 86.5 parts of ion-exchanged water was added 60 parts (in terms of resin solid content) of the pigment dispersion resin (D) was added, then 7.5 parts of the amine-modified epoxy resin emulsion (1) obtained in Production Example 4 was added and mixed, and further pigments, namely, 1 part of carbon, 40 parts of titanium oxide and 53.6 parts of Satintone (calcined kaolin) were added such that the solid concentration of the dispersed paste became 47% by mass, and were stirred at 40° C. for 1 hour at 2000 rpm using a sand mill to afford a pigment dispersion paste.

Using the obtained pigment dispersion paste, an electrodeposition coating composition was obtained by the same procedure as in Example 4, except that 20.9 parts of dibutyltin oxide dispersion paste (tin catalyst content: 1.2%) which is a tin catalyst dispersed paste was used.

Using the electrodeposition coating compositions obtained by the preparation methods of the examples and comparative examples, the following evaluations were performed.

Preparation of Electrodeposition Coated Plate Having Cured Electrodeposition Coating Film A cold-rolled steel sheet (JIS G3141, SPCC-SD) was immersed in SURFCLEANER EC90 (produced by Nippon Paint Surf Chemicals Co., Ltd.) at 50° C. for 2 minutes, thereby being degreased. Next, the steel sheet was immersed in SURFFINE GL1 (produced by Nippon Paint Surf Chemicals Co., Ltd.) at room temperature for 30 seconds, and immersed in SURFDYNE 6350 (produced by Nippon Paint Surf Chemicals Co., Ltd.) at 35° C. for 2 minutes. The steel sheet was rinsed with deionized water. On the other hand, to the electrodeposition coating composition obtained in each of examples and comparative examples, a necessary amount of 2-ethylhexyl glycol was added so that the electrodeposition coating film had a thickness of 15 μM after curing. Thereafter, the steel sheet was fully embedded in the electrodeposition coating composition, and application of a voltage was then immediately started. The voltage was applied under such a condition that the voltage was raised for 30 seconds to 180 V, and the steel sheet was held for 150 seconds. Thus, an uncured electrodeposition coating film was deposited on the article to be coated (cold-rolled steel sheet). The resulting uncured electrodeposition film was heated and cured at 160° C. for 15 minutes, so that an electrodeposition coated sheet having a cured electrodeposition coating film was obtained.

Edge Part Rust Prevention Performance Evaluation Test

For evaluation in this test, a sample obtained by immersing an L-shaped dedicated replacement blade (LB 10 K:

manufactured by OLFA CORPORATION) in a SURFCLEANER EC 90 (manufactured by Nippon Paint Surf Chemicals Co., Ltd.) at 50° C. for 2 minutes to perform a degreasing treatment, adjusting the surface of the blade with SURFFINE GL-1 (manufactured by Nippon Paint Surf Chemicals Co., Ltd.), and then immersing the blade in SURFDYNE SD-5000 (zinc phosphate chemical conversion solution manufactured by Nippon Paint Surf Chemicals Co., Ltd.) as a zinc phosphate chemical conversion solution at 40° C. for 2 minutes to perform a zinc phosphate chemical conversion treatment was used, in place of the cold-rolled steel sheet. The electrodeposition coating composition obtained in each of the above-described examples and comparative examples was applied to the above-mentioned sample by electrodeposition coating under the same conditions as in the case of the above-described electrodeposition coating, and heated and cured to form a cured electrodeposition coating film, a salt water spraying test (35° C. x 168 hours) was then conducted in accordance with JIS Z 2371 (2000), and the number of rusts generated at the tip portion of the L-shaped dedicated replacement blade was counted. The evaluation criteria were as follows, and ⊙Δ or more was regarded as acceptable.

Evaluation Criteria

⊙: The number of rusts is less than 10.
○: The number of rusts is 10 or more and less than 20.
○Δ: The number of rusts is 20 or more and less than 50.
Δ: The number of rusts is 50 or more and less than 100.
x: The number of rusts is 100 or more.

Appearance Evaluation (Color Unevenness)

The electrodeposition coating composition obtained in each of examples and comparative examples was stirred at 1000 rpm, stirring was then stopped, the steel sheet was fully embedded horizontally, held for 3 minutes, and application of a voltage was started. A voltage was applied under such a condition that the voltage was raised for 30 seconds to 180 V, and the steel sheet was held for 150 seconds. Thus, an uncured electrodeposition film was deposited on the object to be coated (cold-rolled steel sheet). The resulting uncured electrodeposition film was heated and cured at 160° C. for 15 minutes, so that an electrodeposition coated sheet having an electrodeposition coating film was obtained. For the electrodeposition coated sheet, presence/absence of defects in the coating film appearance of the upper and lower surfaces was visually evaluated. The evaluation criteria were as follows, and ○Δ or more was regarded as acceptable.

Evaluation Criteria

○: Both the upper and lower surfaces have a uniform coating film appearance, and have no unevenness.

○Δ: The coating films of the upper and lower surfaces have a part visually recognized as having slight unevenness, but have a substantially uniform coating film appearance as a whole (there is no problem in practical use).

Δ: The coating films of the upper and lower surfaces have a part visually recognized as having unevenness, and have an uneven coating film appearance as a whole (there is a problem in practical use).

x: The coating film on the horizontal lower surface side is visually recognized as having marked unevenness (there is a problem in practical use).

Storage Stability Evaluation

The state after the pigment dispersion pastes used in the examples and comparative examples were left to stand in a heat-retaining chamber at 40° C. for 1 week was examined. The evaluation criteria were as follows, and ○ or more was regarded as acceptable.

Evaluation Criteria

○: Neither thickening nor sedimentation was observed.
Δ: Although some thickening or sedimentation was observed, the mixture was immediately loosened when stirred.
x: Thickening or sedimentation was observed, and the mixture was not loosened even when stirred.

Evaluation of Coatability

Coatability was evaluated by a suppression performance test of gas pinhole generation during electrodeposition coating. The pretreated galvannealed steel sheet was immersed as a cathode, and the distance between electrodes was 15 cm and the liquid temperature was adjusted to 30° C. The applied voltage was increased to a predetermined voltage in 30 seconds, and after reaching the predetermined voltage, the applied voltage was held for 150 seconds. The lowest voltage at which pinholes occurred in the electrodeposition coating film after baking and drying was defined as limit voltage. It can be said that the higher the limit voltage, the higher the gas pinhole generation voltage and the better suppression performance of gas pinhole generation. The evaluation criteria were as follows, and ○Δ or more was regarded as acceptable.

Evaluation Criteria

○: A gas pinhole occurs at a coating voltage of 50 V or more from a coating voltage of 15 μm.
○Δ: A gas pinhole occurs at a coating voltage of 30 V or more and less than 50 V from the coating voltage of 15 μm.
Δ: A gas pinhole occurs at a coating voltage being 15 μm coat voltage or more and less than 30 V.
x: A gas pinhole occurs at coating voltage less than 15 μm coating voltage.

TABLE 1

|  |  | Example 1 | Example 2 | Example 3 | Example 4 | Example 5 |
|---|---|---|---|---|---|---|
| Bismuth compound (c1) | Bismuth oxide | 5.5 | 5.6 | 5.5 | 5.6 | 5.5 |
|  | Bismuth hydroxide |  |  |  |  |  |
| Organotin curing catalyst |  |  |  |  |  |  |
| Metal oxide (c2) | La | 5.8 |  |  |  |  |
|  | Nd |  | 5.9 |  |  |  |
|  | Ce |  |  | 5.8 |  |  |
|  | Y |  |  |  | 5.8 |  |
|  | Pr |  |  |  |  | 5.8 |
|  | Yb |  |  |  |  |  |

TABLE 1-continued

| | | | | | | |
|---|---|---|---|---|---|---|
| Monohydroxycarboxylic acid having 3 to 5 carbon atoms (c3) | Lactic acid (L-form) | 17.7 | 17.7 | 17.7 | 17.7 | 17.7 |
| | 2-Hydroxybutyric acid (L-form) | | | | | |
| | Lactic acid (DL-form) | | | | | |
| Polyvalent acid (E) | Tartaric acid | 1.9 | 1.9 | 1.9 | 1.9 | 1.9 |
| | Citric acid | | | | | |
| Viscosity modifier | SN-001S | 0.2 | 0.2 | 0.2 | 0.2 | 0.2 |
| Pigment dispersant | | 90.5 | 90.5 | 90.5 | 90.5 | 90.5 |
| pH at time of mixing bismuth compound (c1) and monohydroxycarboxylic acid (c3) | | 2.9 | 2.9 | 2.9 | 2.9 | 2.9 |
| Viscosity (mPa · s) of bismuth-metal oxide mixture liquid (C) | | 3 | 3 | 3 | 3 | 3 |
| Evaluation | Edge part rust prevention property | ⊙ | ⊙ | ⊙ | ⊙ | ⊙ |
| | Coating film appearance | ○ | ○ | ○ | ○ | ○ |
| | Storage stability | ○ | ○ | ○ | ○ | ○ |
| | Coating workability | ○ | ○ | ○ | ○ | ○ |

| | | Example 6 | Example 7 | Example 8 | Example 9 | Example 10 |
|---|---|---|---|---|---|---|
| Bismuth compound (c1) | Bismuth oxide | 5.5 | 5.6 | | 5.5 | 3.6 |
| | Bismuth hydroxide | | | 5.5 | | |
| | Organotin curing catalyst | | | | | |
| Metal oxide (c2) | La | | 5.9 | 5.8 | 5.8 | 3.8 |
| | Nd | | | | | |
| | Ce | | | | | |
| | Y | | | | | |
| | Pr | | | | | |
| | Yb | 5.8 | | | | |
| Monohydroxycarboxylic acid having 3 to 5 carbon atoms (c3) | Lactic acid (L-form) | 17.7 | | 17.7 | 17.7 | 11.6 |
| | 2-Hydroxybutyric acid (L-form) | | 20.7 | | | |
| | Lactic acid (DL-form) | | | | | |
| Polyvalent acid (E) | Tartaric acid | 1.9 | 1.9 | 1.9 | | 1.9 |
| | Citric acid | | | | 1.9 | |
| Viscosity modifier | SN-001S | 0.2 | 0.2 | 0.2 | 0.2 | 0.2 |
| Pigment dispersant | | 90.5 | 90.5 | 90.5 | 90.5 | 90.5 |
| pH at time of mixing bismuth compound (c1) and monohydroxycarboxylic acid (c3) | | 2.9 | 2.9 | 2.9 | 4 | 4 |
| Viscosity (mPa · s) of bismuth-metal oxide mixture liquid (C) | | 3 | 3 | 3 | 3 | 3 |
| Evaluation | Edge part rust prevention property | ⊙ | ⊙ | ⊙ | ⊙ | ⊙ |
| | Coating film appearance | ○ | ○ | ○ | ○ | ○ |
| | Storage stability | ○ | ○ | ○ | ○ | ○ |
| | Coating workability | ○ | ○ | ○ | ○ | ○ |

TABLE 2

| | | Example 11 | Example 12 | Example 13 | Example 14 | Example 15 |
|---|---|---|---|---|---|---|
| Bismuth compound (c1) | Bismuth oxide | 5.5 | 0.7 | 5.5 | 5.5 | 5.5 |
| | Bismuth hydroxide | | | | | |
| | Organotin curing catalyst | | | | | |
| Metal oxide (c2) | La | 5.8 | 9.2 | 5.8 | 5.8 | 5.8 |
| | Nd | | | | | |
| | Ce | | | | | |
| | Y | | | | | |
| | Pr | | | | | |
| | Yb | | | | | |
| Monohydroxycarboxylic acid having 3 to 5 carbon atoms (c3) | Lactic acid (L-form) | 17.7 | 2.03 | 17.7 | 17.7 | 14.1 |
| | 2-Hydroxybutyric acid (L-form) | | | | | |
| | Lactic acid (DL-form) | | | | | 3.6 |
| Polyvalent acid (E) | Tartaric acid | 1.9 | 1.9 | 1.9 | 1.9 | 1.9 |
| | Citric acid | | | | | |
| Viscosity modifier | SN-001S | 0.2 | 0.2 | 0.11 | 0.2 | 0.2 |
| Pigment dispersant | | 90.5 | 90.5 | 90.5 | 90.5 | 90.5 |
| pH at time of mixing bismuth compound (c1) and monohydroxycarboxylic acid (c3) | | 2.9 | 4 | 2.5 | 2.9 | 2.9 |
| Viscosity (mPa · s) of bismuth-metal oxide mixture liquid (C) | | 3 | 3 | 2.5 | 3 | 3 |
| Evaluation | Edge part rust prevention property | ○Δ | ○Δ | ○Δ | ⊙ | ⊙ |
| | Coating film appearance | ○Δ | ○Δ | ○Δ | ○ | ○Δ |
| | Storage stability | ○ | ○ | ○ | ○ | ○ |
| | Coating workability | ○Δ | ○Δ | ○Δ | ○ | ○ |

TABLE 2-continued

|  |  | Comparative Example 1 | Comparative Example 2 | Comparative Example 3 | Comparative Example 4 |
|---|---|---|---|---|---|
| Bismuth compound (c1) | Bismuth oxide | 5.5 | 5.3 | 5.5 |  |
|  | Bismuth hydroxide |  |  |  |  |
| Organotin curing catalyst |  |  |  |  | 20.9 |
| Metal oxide (c2) | La | 5.8 |  | 5.8 |  |
|  | Nd |  |  |  |  |
|  | Ce |  |  |  |  |
|  | Y |  |  |  |  |
|  | Pr |  |  |  |  |
|  | Yb |  |  |  |  |
| Monohydroxycarboxylic acid having 3 to 5 carbon atoms (c3) | Lactic acid (L-form) |  | 4.1 | 17.7 |  |
|  | 2-Hydroxybutyric acid (L-form) |  |  |  |  |
|  | Lactic acid (DL-form) | 17.7 |  |  |  |
| Polyvalent acid (E) | Tartaric acid | 1.9 | 1.9 |  |  |
|  | Citric acid |  |  |  |  |
| Viscosity modifier | SN-001S | 0.2 | 0.2 | 0.2 | 0.2 |
| Pigment dispersant |  | 90.5 | 90.5 | 90.5 | 60 |
| pH at time of mixing bismuth compound (c1) and monohydroxycarboxylic acid (c3) |  | 5 | 5 | 2.9 | — |
| Viscosity (mPa·s) of bismuth-metal oxide mixture liquid (C) |  | 3 | 3 | 3 | — |
| Evaluation | Edge part rust prevention property | ○ | X | Δ | X |
|  | Coating film appearance | X | ○ | ○Δ | ○ |
|  | Storage stability | Δ | ○ | X | ○ |
|  | Coating workability | ○ | ○ | ○ | ○ |

It was confirmed that all of the electrodeposition coating compositions obtained in the examples were superior in storage stability and coating workability, and cured electrodeposition coating films having good edge part rust prevention property and coating film appearance were obtained.

Comparative Example 1 is an example using a monohydroxycarboxylic acid in which the amount of the L-form is less than 80%. In this example, it was confirmed that the storage stability was poor, and the coating film appearance of the cured electrodeposition coating film was poor.

Comparative Example 2 is an example in which the metal oxide (c2) is not contained. In this example, it was confirmed that the edge part rust prevention property was poor.

Comparative Example 3 is an example in which the polyvalent acid (E) is not contained. In this example, it was confirmed that the storage stability was poor, and the edge part rust prevention property of the cured electrodeposition coating film was poor.

Comparative Example 4 is an example in which the bismuth compound (c1) and the metal oxide (c2) are not contained and an organotin compound is contained instead of these compounds. In this example, it was confirmed that the edge part rust prevention property of the cured electrodeposition coating film was poor.

INDUSTRIAL APPLICABILITY

The electrodeposition coating composition of the present invention can be suitably used in, for example, undercoating in automobile coating.

The invention claimed is:

1. A method for preparing a cationic electrodeposition coating composition, comprising the following steps:
    a step of preparing a resin emulsion (i) comprising an aminated resin (A) and a blocked isocyanate curing agent (B);
    a step of preparing a pigment dispersion paste (ii) comprising a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F); and
    a step of mixing the resin emulsion (i) and the pigment dispersion paste (ii) to prepare a cationic electrodeposition coating composition, wherein
    the pigment dispersion paste (ii) is prepared by the following steps:
    a bismuth-metal oxide mixture liquid (C) preparation step of mixing the bismuth compound (c1), the metal oxide (c2), the monohydroxycarboxylic acid (c3) having 3 to 5 carbon atoms in total and the solvent to prepare the bismuth-metal oxide mixture liquid (C); and
    a pigment dispersion paste (ii) preparation step of mixing the obtained bismuth-metal oxide mixture liquid (C) and the polyvalent acid (E), and then mixing the obtained mixture, the pigment dispersion resin (D) and the pigment (F) to prepare the pigment dispersion paste (ii);
    the metal oxide (c2) contains one or more metal elements selected from the group consisting of La, Nd, Y, Pr, Yb and Ce,
    the monohydroxycarboxylic acid (c3) having 3 to 5 carbon atoms in total has an asymmetric carbon atom, the monohydroxycarboxylic acid (c3) containing 80% or more of an L-form among its optical isomers, and
    in the bismuth-metal oxide mixture liquid (C) preparation step, the viscosity of the bismuth-metal oxide mixture liquid (C) is within a range of 2.5 mPa·s to 15 mPa·s.

2. The preparation method according to claim 1, wherein in the bismuth-metal oxide mixture liquid (C) preparation step, the bismuth-metal oxide mixture liquid (C) is prepared by performing mixing of the bismuth compound (c1) with the monohydroxycarboxylic acid (c3) and mixing of the metal oxide (c2) with the monohydroxycarboxylic acid (c3), and then mixing the mixtures obtained by the respective mixings with a solvent,
    the mixing of the bismuth compound (c1) with the monohydroxycarboxylic acid (c3) is performed at a pH within a range of 2.0 to 4.1, and
    the ratio of the number of moles of the metal element of the bismuth compound (c1) contained in the bismuth-metal oxide mixture liquid (C) to the number of moles of the monohydroxycarboxylic acid (c3) is in a range of (c1):(c3)=1:0.5 to 1:4.0.

3. The preparation method according to claim 2, wherein in the mixing of the metal oxide (c2) with the monohydroxycarboxylic acid (c3), the ratio of the number of moles of the metal element of the metal oxide (c2) contained in the bismuth-metal oxide mixture liquid (C) to the number of moles of the monohydroxycarboxylic acid (c3) is within a range of (c2):(c3)=1:0.5 to 1:3.25.

4. The preparation method according to claim 1, wherein the molar ratio of the metal element of the bismuth compound (c1) to that of the metal oxide (c2) contained in the bismuth-metal oxide mixture liquid (C) is within a range of (c1):(c2)=0.1:1 to 10:1.

5. The preparation method according to claim 1, wherein the polyvalent acid (E) is one or more compounds selected from the group consisting of compounds having two or more carboxylic acid groups and compounds having a phosphoric acid group.

6. A method for preparing a pigment dispersion paste, wherein
   the pigment dispersion paste comprises a bismuth-metal oxide mixture liquid (C) comprising a bismuth compound (c1), a metal oxide (c2), a monohydroxycarboxylic acid (c3) having 3 to 5 carbon atoms in total and a solvent; a pigment dispersion resin (D); a polyvalent acid (E); and a pigment (F); the method for preparing the pigment dispersion paste comprises the following steps:
   a bismuth-metal oxide mixture liquid (C) preparation step of mixing the bismuth compound (c1), the metal oxide (c2), the monohydroxycarboxylic acid (c3) having 3 to 5 carbon atoms in total and the solvent to prepare the bismuth-metal oxide mixture liquid (C); and
   a pigment dispersion paste (ii) preparation step of mixing the obtained bismuth-metal oxide mixture liquid (C) and the polyvalent acid (E), and then mixing the obtained mixture, the pigment dispersion resin (D) and the pigment (F) to prepare the pigment dispersion paste (ii);

the metal oxide (c2) contains one or more metal elements selected from the group consisting of La, Nd, Y, Pr, Yb and Ce, the monohydroxycarboxylic acid (c3) having 3 to 5 carbon atoms in total has an asymmetric carbon atom, the monohydroxycarboxylic acid (c3) containing 80% or more of an L-form among its optical isomers, and in the bismuth-metal oxide mixture liquid (C) preparation step, the viscosity of the bismuth-metal oxide mixture liquid (C) is within a range of 2.5 mPa·s to 15 mPa·s.

7. The preparation method according to claim 6, wherein
   in the bismuth-metal oxide mixture liquid (C) preparation step, the bismuth-metal oxide mixture liquid (C) is prepared by performing mixing of the bismuth compound (c1) with the monohydroxycarboxylic acid (c3) and mixing of the metal oxide (c2) with the monohydroxycarboxylic acid (c3), and then mixing the mixtures obtained by the respective mixings with a solvent,
   the mixing of the bismuth compound (c1) with the monohydroxycarboxylic acid (c3) is performed at a pH within a range of 2.0 to 4.1, and
   the ratio of the number of moles of the metal element of the bismuth compound (c1) contained in the bismuth-metal oxide mixture liquid (C) to the number of moles of (c3) is within a range of (c1):(c3)=1:0.5 to 1:4.0.

8. The preparation method according to claim 6, wherein in the mixing of the metal oxide (c2) with the monohydroxycarboxylic acid (c3), the ratio of the number of moles of the metal element of the metal oxide (c2) contained in the bismuth-metal oxide mixture liquid (C) to the number of moles of the monohydroxycarboxylic acid (c3) is within a range of (c2):(c3)=1:0.5 to 1:3.25.

9. The preparation method according to claim 6, wherein the polyvalent acid (E) is one or more compounds selected from the group consisting of compounds having two or more carboxylic acid groups and compounds having a phosphoric acid group.

* * * * *